(12) United States Patent
Kuo et al.

(10) Patent No.: US 10,788,912 B2
(45) Date of Patent: Sep. 29, 2020

(54) TOUCH DISPLAY MODULE AND ELECTRONIC DEVICE USING SAME

(71) Applicant: Reco Technology (Chengdu) Co., Ltd., Chengdu (CN)

(72) Inventors: Yu-Pi Kuo, Hsinchu (TW); Sin-Cheng Lin, New Taipei (TW); Chung-Wu Liu, Hsinchu (TW); Chun-Te Chang, Hsinchu (TW); Wan-Heng Lin, New Taipei (TW)

(73) Assignee: Reco Technology (Chengdu) Co., Ltd., Chengdu (CN)

( * ) Notice: Subject to any disclaimer, the term of this patent is extended or adjusted under 35 U.S.C. 154(b) by 0 days.

(21) Appl. No.: 16/215,917

(22) Filed: Dec. 11, 2018

(65) Prior Publication Data
US 2020/0050307 A1     Feb. 13, 2020

(30) Foreign Application Priority Data
Aug. 10, 2018  (CN) .......................... 2018 1 0909052

(51) Int. Cl.
*G06F 3/043* (2006.01)
*G06F 3/041* (2006.01)
*G06F 3/045* (2006.01)
*G06K 9/00* (2006.01)

(52) U.S. Cl.
CPC ............ *G06F 3/0412* (2013.01); *G06F 3/043* (2013.01); *G06F 3/045* (2013.01); *G06K 9/0002* (2013.01)

(58) Field of Classification Search
None
See application file for complete search history.

(56) References Cited

U.S. PATENT DOCUMENTS

2019/0294770 A1*  9/2019  Han ......................... G06F 21/32

* cited by examiner

*Primary Examiner* — Brian M Butcher
(74) *Attorney, Agent, or Firm* — ScienBiziP, P.C.

(57) ABSTRACT

A touch display module utilizing touch recognition by ultrasound includes display unit on substrate, barrier layer on other side of the substrate, and an ultrasound fingerprint sensing unit on the barrier layer. An acoustic impedance of the display unit, the barrier layer, and the ultrasonic fingerprint sensing unit are not all the same, and the differences in impedances enable recognition of touches by analysis of reflected ultrasound. The disclosure also provides an electronic device using the touch display module.

16 Claims, 4 Drawing Sheets

TOUCH DISPLAY MODULE AND ELECTRONIC DEVICE USING SAME

FIELD

The present disclosure relates to touch sensing module, and more particularly to an electronic device using the same.

BACKGROUND

The fingerprint recognition device can be included in a smart phone. The fingerprint recognition device can analyze fingerprint of a finger placed thereon. When a user places his finger on a surface of the fingerprint recognition device, the fingerprint of the user's finger can be identified to verify the user's identity.

The fingerprint recognition device can be an optical type, a capacitive type, and an acoustic wave type etc. Since the acoustic wave type fingerprint recognition device includes some advantages, such as not affected by environmental temperature and humidity, long life and high resolution, it is widely used in various electronic devices. However, the ultrasonic fingerprint recognition device is hard used in the fingerprint recognition under a screen, due to some limitations of physical properties of ultrasonic wave.

Therefore, there is room for improvement in the art.

BRIEF DESCRIPTION OF THE DRAWINGS

Implementations of the present disclosure will now be described, by way of embodiments, with reference to the attached figures.

DETAILED DESCRIPTION

Figure 1:
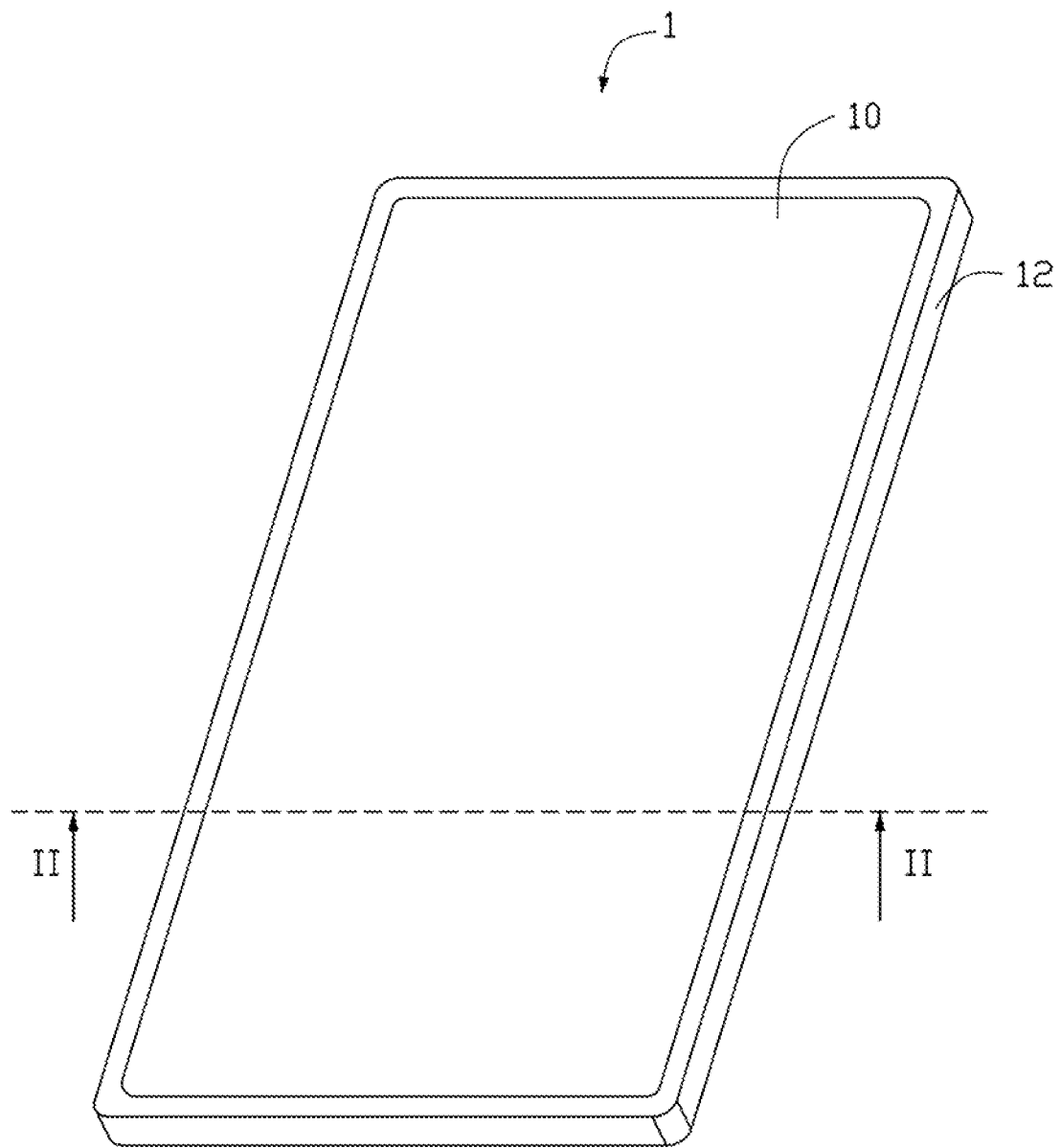
FIG. 1 is a perspective view of an embodiment of an electronic device.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one". The term "circuit" is defined as an integrated circuit (IC) with electric elements, such as capacitors, resistors, amplifiers, and the like.

FIG. 1 is a perspective view of an embodiment of an electronic device 1. The electronic device 1 includes a main body 12 and a touch display module 10 disposed in the main body 12. In one embodiment, the electronic device 1 is a smart phone. In other embodiments, the electronic device 1 may be an electronic product with a display function such as a computer, a television, an MP4 player, and a workstation.

Figure 2:
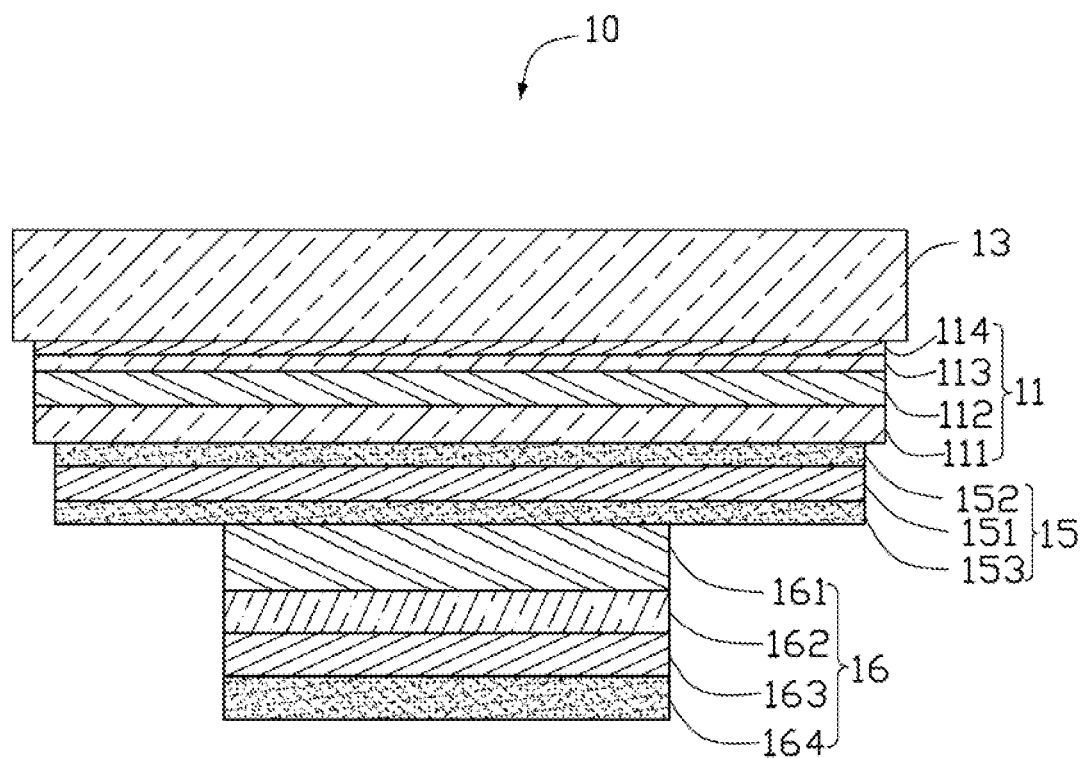
FIG. 2 is a cross-sectional view taken along line II-II of FIG. 1.

FIG. 2 is along line II-II of FIG. 1, and in detail is a cross-sectional view of the touch display module 10. As shown in FIG. 2, the touch display module 10 includes a display unit 11, a barrier layer 15, an ultrasonic fingerprint sensing unit 16, and a cover plate 13.

The display unit 11 includes a substrate 111 for carrying other elements of the display unit 11. The cover plate 13 is disposed on a side of the display unit 11. A surface of the cover plate 13 away from the display unit 11 is an area where the user performs a touch operation. The barrier layer 15 is adhered to a surface of the substrate 111 at a side away from the cover plate 13. The ultrasonic fingerprint sensing unit 16 is adhered to a surface of the barrier layer 15 away from the display unit 11, and the ultrasonic fingerprint sensing unit 16 performs acquisition of fingerprint signals on a surface of the cover plate 13 by transmitting and receiving ultrasonic waves.

In an embodiment, an acoustic impedance of the display unit 11, an acoustic impedance of the barrier layer 15, and an acoustic impedance of the ultrasonic fingerprint sensing unit 16 are not all the same. A value of the acoustic impedance of the barrier layer 15 is between those of the display unit 11 and of the ultrasonic fingerprint sensing unit 16. The acoustic impedance of the barrier layer 15 may be equal to or similar to the acoustic impedance of the display unit 11 or that of the ultrasonic fingerprint sensing unit 16. In other embodiments, the acoustic impedance of the display unit 11, the acoustic impedance of the barrier layer 15, and the acoustic impedance of the ultrasonic fingerprint sensing unit 16 can be the same or similar.

The display unit 11 further includes a light emitting array 112 and a polarizer 113. The light-emitting array 112 is disposed on the side of the substrate 111 away from the barrier layer 15. The light emitting array 112 may include light emitting units for emitting light, and the light emitting unit may be an Organic Light-Emitting Diode (OLED), a Micro Light-Emitting Diode (MLED), or the like. The light emitting array 112 may also include a thin film transistor (TFT) array for controlling the operation of the light emitting units. The thin film transistor array achieves image displays by driving and controlling the operation of the light emitting units.

The polarizer 113 is disposed on a side of the light-emitting array 112 away from the substrate 111. The polarizer 113 may filter or otherwise process the light emitted by the light-emitting array 112 to improve the display quality.

The display unit 11 further includes a touch layer 114. The touch layer 114 is disposed on a side of the polarizer 113 away from the light emitting array 112. In an embodiment, the touch layer 114 is an in-cell sensing layer (In-cell touch). In other embodiments, the touch layer 114 may be an On-cell touch, or the touch layer 114 may be integrated into the cover plate 13. In an embodiment, the touch layer 114 is a self-capacitive sensing structure. In other embodiments, the touch layer may be a mutual capacitive sensing structure or a resistive sensing structure.

The substrate 111 in the display unit 11 may be made of a flexible material or a non-flexible material. In this embodiment, the substrate 111 is made of a flexible material and has flexibility, so that the display unit 11 can be applied to a curved display device or a flexible display. The material of the substrate 111 may be organic, such as Polyimide (PI), polyethylene naphthalate two formic acid glycol ester (PEN) or polyethylene glycol terephthalate (PET). In other embodiments, the material of the substrate 111 may be semi-rigid or non-flexible, and the material of the substrate 111 may be silicon dioxide ($SiO_2$) or polycarbonate (PC).

The barrier layer 15 includes a conductive layer 151 and an adhesive layer. The adhesive layer includes a first adhesive layer 152 and a second adhesive layer 153. The conductive layer 151 is between the first adhesive layer 152 and the second adhesive layer 153. The barrier layer 15 is between the display unit 11 and the ultrasonic fingerprint sensing unit 16. The display unit 11 is bonded to the barrier layer 15 by the first adhesive layer 152. The ultrasonic fingerprint sensing unit 16 is bonded to the barrier layer 15 by the second adhesive layer 153.

The conductive layer 151 has electrical conductivity. The material of the conductive layer 151 may be a metal, an alloy, a conductive polymer, an organic material doped with conductive particles, or a conductive material such as a metal oxide. The material of the conductive layer 151 may specifically be copper (Cu), silver (Ag), gold (Au), brass (an alloy of Cu and Zn), or indium tin oxide (ITO).

In an embodiment, the conductive layer 151 can serve as an electrostatic shield (ESD) to avoid electrostatics influencing the display unit 11 on the ultrasonic fingerprint sensing unit 16 and some circuits in the electronic device 1. The conductive layer 151 may be connected to a conductor having a ground potential to conduct static electricity away, and the conductive layer 151 may be directly grounded, connected to the metal casing of the electronic device 1, or the thin film transistor array of the display unit 11. In an embodiment, the conductive layer 151 has a thickness of 50 μm, and the conductive layer 151 has a sheet resistance of less than 200 mΩ to provide better electrical conductivity. In other embodiments, the thickness and surface resistance of the conductive layer 151 may be other reasonable values.

The material of the adhesive layer may be epoxy resin, polyester fiber, acrylic resin, polyurethane, unsaturated polyester, and a viscose of at least one of the organic silica gels.

In an embodiment, when the ultrasonic fingerprint sensing unit 16 or the display unit 11 need repair, a solvent (e.g., ethyl acetate) can separate, without damage, the substrate 111 and the ultrasonic fingerprint sensing unit 16 by dissolving the first adhesive layer 152 and the second adhesive layer 153.

In an embodiment, the first adhesive layer 152 or the second adhesive layer 153 may be a solid adhesive to prevent scratching of the surface of the display unit 11 or the ultrasonic fingerprint sensing unit 16 during solidification of a liquid adhesive.

In an embodiment, the first adhesive layer 152 and the second adhesive layer 153 can serve as an optical shielding layer to prevent the light emitted by the display unit 11 from affecting the ultrasonic fingerprint sensing unit 16 and some circuits in the electronic device 1. An optical density of the first adhesive layer 152 or the second adhesive layer 153 may be greater than or equal to 4 to enhance the blocking of light.

In an embodiment, the first adhesive layer 152 and the second adhesive layer 153 may be made of the same material and structure. In other embodiments, the first adhesive layer 152 and the second adhesive layer 153 may also be made of different materials and structures.

The ultrasonic fingerprint sensing unit 16 includes an array substrate 161, a piezoelectric layer 162, an electrode layer 163, and a protective layer 164. The array substrate 161 is bonded to the barrier layer 15. The piezoelectric layer 162 covers a side of the array substrate 161 away from the barrier layer 15. The electrode layer 163 covers a side of the piezoelectric layer 162 away from the array substrate 161. The protective layer 164 covers a side of the electrode layer 163 away from the piezoelectric layer 162

In an embodiment, the array substrate 161 includes a pixel circuit array composed of thin film transistors (TFTs). Each pixel circuit includes one or more TFTs. Each TFT includes at least one pixel electrode. The pixel electrodes are electrically connected to the piezoelectric layer 162 and cooperate with the electrode layer 163 to drive the piezoelectric layer 162 to emit and receive ultrasound.

In an embodiment, the thickness of the array substrate 161 may range from greater than or equal to 1 μm to less than 1 mm. In an embodiment, the piezoelectric layer 162 may be a piezoelectric material such as piezoelectric ceramic (PZT) or polyvinylidene fluoride (PVDF). The piezoelectric layer 162 may have a thickness ranging from not less than 1 μm to not more than 50 μm.

Figure 3:
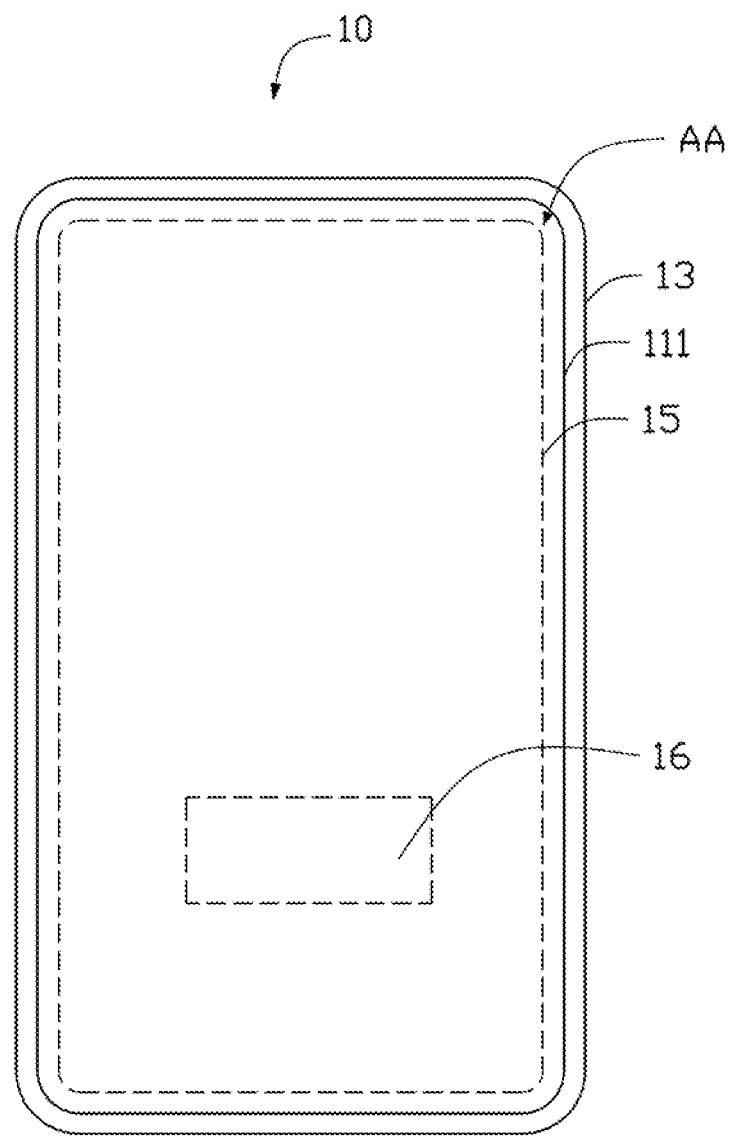
FIG. 3 is a planar projection view of an embodiment of a touch display module.

FIG. 3 shows touch display module 10. As shown in FIG. 3, a projection area of the substrate 111 on the cover plate 13 is less than an area of the cover plate 13. A projection area of the barrier layer 15 on the substrate 111 is less than or equal to an area of the substrate 111. A projection area of the ultrasonic fingerprint sensing unit 16 on the substrate 111 is less than or equal to the projection area of the barrier layer 15 on the substrate 111.

In an embodiment, the projection area of the ultrasonic fingerprint sensing unit 16 on the substrate 111 is not less than 10 $mm^2$. The touch display module 10 further includes a display area AA for displaying pictures, and for user to perform an effective touch operation. Part of the display unit 11 is located in the display area AA, and the ultrasonic fingerprint sensing unit 16 is located in the display area AA. When the user's finger presses on the area corresponding to the ultrasonic fingerprint sensing unit 16 in the display area AA, the finger reflects an ultrasonic wave emitted by the ultrasonic fingerprint sensing unit 16. The reflected ultrasonic wave is received by the ultrasonic fingerprint sensing unit 16 for analysis of fingerprint.

Figure 4:
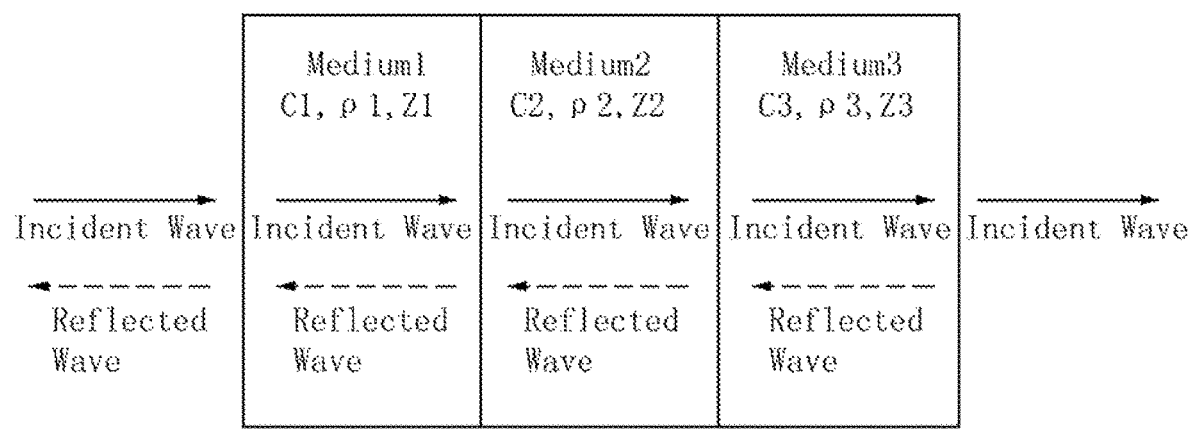
FIG. 4 is a schematic diagram showing propagation of ultrasonic waves passing through three continuous media.

FIG. 4 is a schematic diagram showing propagation of ultrasonic waves passing through three continuous media. As shown in FIG. 4, medium 1, medium 2, and medium 3 have different densities, being $\rho 1$, $\rho 2$, and $\rho 3$, respectively. The ultrasonic waves have different waves, being C1, C2, and C3 respectively in medium 1, medium 2, and medium 3. The impedance formula $Z = \rho \times C$ tells us that the density $\rho$ and the acoustic wave velocity C in different media are not completely the same, which causes the acoustic impedance Z of the different media to be different.

Ultrasonic waves generally have losses during the propagation process. When the ultrasonic waves pass through the interface of two different media with different impedances Z of the two media, the ultrasonic waves will be reflected. The greater difference between the impedance Z of the two media is, the greater ratio of the reflected of the ultrasonic wave is. That is, the losses will be higher. The smaller difference of the impedances Z between the two media is, the smaller ratio of reflected ultrasonic wave is. That is, the losses will be higher. When the ultrasonic wave penetrates three different layers of medium, as shown in FIG. 4, if the impedance Z2 of the medium 2 is $(Z1 \cdot Z3)^{1/2}$, ultrasonic losses are minimized.

The ultrasonic wave emitted by the ultrasonic fingerprint sensing unit 16 transmits to the surface of the cover plate 13 contacted by the user's finger and reflected. The reflected ultrasonic waves transmits from the surface of the cover 13 to the ultrasonic fingerprint sensing unit 16, and thus received by the ultrasonic fingerprint sensing unit 16 and converted into electrical signals.

In an embodiment, the acoustic impedance of the display unit 11 and the acoustic impedance of the ultrasonic fingerprint sensing unit 16 are different, and the value of the acoustic impedance of the barrier layer 15 is between the display unit 11 and the ultrasonic fingerprint sensing unit 16. A sum of the two losses when the ultrasonic waves sequentially pass through the ultrasonic fingerprint sensing unit 16, the barrier layer 15, and the display unit 11 is smaller than a single loss when the ultrasonic waves directly pass through the interface of the direct contact of the display unit 11 and the ultrasonic fingerprint sensing unit 16. The barrier layer 15 serves as a buffer layer between the display unit 11 and the ultrasonic fingerprint sensing unit 16 to reduce the losses in ultrasonic waves during propagation. When the value of the acoustic impedance of the barrier layer 15 is equal to or approximates to a square root of a product of the acoustic impedances of the display unit 11 and of the ultrasonic fingerprint sensing unit 16, the losses are minimized.

The barrier layer 15 serves as a buffer layer between the display unit 11 and the ultrasonic fingerprint sensing unit 16, and the structure of the barrier layer 15 has an influence on ultrasonic propagation. If the first adhesive layer 152 and the second adhesive layer 153 on both sides of the conductive layer 151 are different, the propagation characteristics of the conductive layer 151, the first adhesive layer 152, and the second adhesive layer 153 are different. The formula $Z2=(Z1 \cdot Z3)^{1/2}$ shows that when the value of the acoustic impedance of the conductive layer 151 is in between that of the first adhesive layer 152 and that of the second adhesive layer 153, the losses in ultrasonic waves passing through the barrier layer 15 is small. If the first adhesive layer 152 and the second adhesive layer 153 on both sides of the conductive layer 151 are the same, then the acoustic impedances of the conductive layer 151, the first adhesive layer 152, and the second adhesive layer 153 will be the same or similar. Formula $Z2=(Z1 \cdot Z3)^2$ dictates that when the acoustic impedances of the conductive layer 151, the first adhesive layer 152, and the second adhesive layer 153 are the same or similar, the loss of ultrasonic waves passing through the barrier layer 15 is minimized. If the respective acoustic impedances of the conductive layer 151, the first adhesive layer 152, and the second adhesive layer 153 are larger, the losses in ultrasonic wave through the barrier layer 15 are also large, and the overall acoustic impedance of the barrier layer 15 is considered to be larger.

It is known that Young's modulus $K=\rho \times C^2$ of a substance is proportional to its acoustic impedance, and Young's modulus can also be used as a measure of a magnitude of the acoustic impedance. In an embodiment, when the Young's modulus of the first adhesive layer 152 or of the second adhesive layer 153 is greater than 3 MPa, the losses during traversals is small.

It is to be understood, even though information and advantages of the present exemplary embodiments have been set forth in the foregoing description, together with details of the structures and functions of the present exemplary embodiments, the disclosure is illustrative only. Changes may be made in detail, especially in matters of shape, size, and arrangement of parts within the principles of the present exemplary embodiments to the full extent indicated by the plain meaning of the terms in which the appended claims are expressed.

What is claimed is:

1. A touch display module, comprising:
   a display unit;
   a barrier layer, the barrier layer being adhered to a surface of the display unit; and
   an ultrasonic fingerprint sensing unit, the ultrasonic fingerprint sensing unit being adhered to a surface of the barrier layer away from the display unit;
   wherein each of the display unit, the barrier layer, and the ultrasonic fingerprint sensing unit has a different acoustic impedance, and a value of the acoustic impedance of the barrier layer is between a value of the acoustic impedance of the display unit and a value of the acoustic impedance of the ultrasonic fingerprint sensing unit,
   wherein the value of the sound impedance of the barrier layer is approximately a square root of a product of the acoustic impedance of the display unit and the acoustic impedance of the ultrasonic fingerprint sensing unit.

2. The touch display module of claim 1, further comprising a display area, wherein part of the display unit is located in the display area, and the ultrasonic fingerprint sensing unit is located in the display area.

3. The touch display module of claim 1, wherein the barrier layer comprises a conductive layer and an adhesive layer, the adhesive layer comprises a first adhesive layer and a second adhesive layer, and the conductive layer is between the first adhesive layer and the second adhesive layer.

4. The touch display module of claim 3, wherein the display unit and the ultrasonic fingerprint sensing unit are bonded to the barrier layer by the adhesive layer.

5. The touch display module of claim 3, wherein an acoustic impedance of the conductive layer is between an acoustic impedance of the first adhesive layer and an acoustic impedance of the second adhesive layer.

6. The touch display module of claim 3, wherein the adhesive layer has an optical density greater than or equal to 4 and a Young's modulus greater than 3 MPa.

7. The touch display module of claim 3, wherein the conductive layer is made of a conductive material, and a surface resistance of the conductive layer is less than 200 mΩ.

8. The touch display module of claim 1, wherein the display unit comprise a substrate, the barrier layer is adhered to a surface of the substrate, a projection area of the barrier layer on the substrate is less than or equal to an area of the substrate, and a projection area of the ultrasonic fingerprint sensing unit on the substrate is less than or equal to a projection area of the barrier layer on the substrate.

9. An electronic device, comprising a main body and a touch display module in the main body, the touch display module, comprising:
   a display unit;
   a barrier layer, the barrier layer being adhered to a surface of the display unit; and
   an ultrasonic fingerprint sensing unit, the ultrasonic fingerprint sensing unit being adhered to a surface of the barrier layer away from the display unit;
   wherein each of the display unit, the barrier layer, and the ultrasonic fingerprint sensing unit has a different acoustic impedance, and a value of the acoustic impedance of the barrier layer is between a value of the acoustic impedance of the display unit and a value of the acoustic impedance of the ultrasonic fingerprint sensing unit, wherein the sound impedance of the barrier layer is approximately a square root of a product of the acoustic impedance of the display unit and the acoustic impedance of the ultrasonic fingerprint sensing unit.

10. The electronic device of claim 9, wherein the touch display module further comprising a display area, part of the display unit is located in the display area, and the ultrasonic fingerprint sensing unit is located in the display area.

11. The electronic device of claim 9, wherein the barrier layer comprises a conductive layer and an adhesive layer, the adhesive layer comprises a first adhesive layer and a second adhesive layer, and the conductive layer is between the first adhesive layer and the second adhesive layer.

12. The electronic device of claim 11, wherein the display unit and the ultrasonic fingerprint sensing unit are bonded to the barrier layer by the adhesive layer.

13. The electronic device of claim 11, wherein an acoustic impedance of the conductive layer is between an acoustic impedance of the first adhesive layer and an acoustic impedance of the second adhesive layer.

14. The electronic device of claim 11, wherein the adhesive layer has an optical density greater than or equal to 4 and a Young's modulus greater than 3 MPa.

15. The electronic device of claim 11, wherein the conductive layer is made of a conductive material, and a surface resistance of the conductive layer is less than 200 mΩ.

16. The electronic device of claim 9, wherein the display unit comprise a substrate, the barrier layer is adhered to a surface of the substrate, a projection area of the barrier layer on the substrate is less than or equal to an area of the substrate, and a projection area of the ultrasonic fingerprint sensing unit on the substrate is less than or equal to a projection area of the barrier layer on the substrate.

* * * * *